United States Patent
Choi et al.

(10) Patent No.: US 12,550,067 B2
(45) Date of Patent: Feb. 10, 2026

(54) ELECTRONIC DEVICE FOR ADJUSTING TRANSMISSION RATE AND OPERATION METHOD THEREFOR

(71) Applicant: Samsung Electronics Co., Ltd., Suwon-si (KR)

(72) Inventors: Junsu Choi, Suwon-si (KR); Hyunkee Min, Suwon-si (KR); Jihoon Sung, Suwon-si (KR); Sunkee Lee, Suwon-si (KR); Junghun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 370 days.

(21) Appl. No.: 18/145,528

(22) Filed: Dec. 22, 2022

(65) Prior Publication Data
US 2023/0132228 A1 Apr. 27, 2023

Related U.S. Application Data

(63) Continuation of application No. PCT/KR2021/006540, filed on May 26, 2021.

(30) Foreign Application Priority Data

Jun. 24, 2020 (KR) .................. 10-2020-0077191

(51) Int. Cl.
*H04W 52/02* (2009.01)
*H04W 28/02* (2009.01)

(52) U.S. Cl.
CPC ... *H04W 52/0261* (2013.01); *H04W 28/0221* (2013.01)

(58) Field of Classification Search
CPC . H04W 28/02; H04W 28/0221; H04W 28/22; H04W 52/02; H04W 52/0261; H04W 88/02; Y02D 30/70

(Continued)

(56) References Cited

U.S. PATENT DOCUMENTS 7,369,510 B1 * 5/2008 Wong .................. H04L 1/20
370/333
7,388,849 B2 * 6/2008 Kim .................... H04W 28/22
370/347

(Continued)

FOREIGN PATENT DOCUMENTS

CN        105722118 A    6/2016
CN        110191461 A    8/2019

(Continued)

OTHER PUBLICATIONS

Korean Office Action dated Jun. 30, 2025, issued in Korean Application No. 10-2020-0077191.

*Primary Examiner* — Nathan S Taylor
(74) *Attorney, Agent, or Firm* — Jefferson IP Law, LLP

(57) ABSTRACT

The disclosure relates to a device and a method for adjusting a transmission rate in an electronic device. The electronic device includes a memory, a communication circuit, and at least one processor operatively connected to the memory and the communication circuit, wherein the at least one processor when wireless communication with an external electronic device is performed, identifies an expected first power consumption amount of a first transmission rate on the basis of the first transmission rate and a failure rate of data transmission related to the first transmission rate, identifies an expected second power consumption amount of a second transmission rate on the basis of the second transmission rate and a failure rate of data transmission related to the second transmission rate, selects, as a data transmission rate, the first transmission rate or the second transmission rate on the basis of the first power consumption amount and the second power consumption amount, and transmits data to the external electronic device on the basis of the selected data transmission rate.

17 Claims, 9 Drawing Sheets

(58) Field of Classification Search
USPC .......................................................... 455/574
See application file for complete search history.

(56) References Cited

U.S. PATENT DOCUMENTS

| | | | | |
|---|---|---|---|---|
| 7,610,495 | B2* | 10/2009 | Azadet ............... | H04W 52/0277 |
| | | | | 455/574 |
| 8,649,449 | B2* | 2/2014 | Nakajima ............ | H04L 1/0001 |
| | | | | 375/267 |
| 2007/0286114 | A1* | 12/2007 | Hoekstra ............. | H04L 47/29 |
| | | | | 455/452.2 |
| 2008/0084823 | A1* | 4/2008 | Akasaka .............. | G08C 17/00 |
| | | | | 370/235 |
| 2009/0154473 | A1* | 6/2009 | Diab .................... | H04L 47/263 |
| | | | | 370/400 |
| 2014/0269655 | A1* | 9/2014 | Du ...................... | H04L 1/0009 |
| | | | | 370/338 |
| 2015/0113333 | A1* | 4/2015 | Kim ..................... | G06F 1/32 |
| | | | | 714/43 |
| 2015/0245359 | A1* | 8/2015 | Kim ..................... | H04L 1/0009 |
| | | | | 370/328 |
| 2019/0246353 | A1* | 8/2019 | Jensen ................. | H04L 67/12 |
| 2019/0260496 | A1* | 8/2019 | Emmanuel ........ | G08B 13/19656 |
| 2020/0359205 | A1* | 11/2020 | Dees ................... | G06F 21/43 |
| 2021/0203447 | A1* | 7/2021 | Tsai .................... | H04W 28/0268 |

FOREIGN PATENT DOCUMENTS

| | | |
|---|---|---|
| JP | 2000-101677 A | 4/2000 |
| KR | 10-2008-0018446 A | 2/2008 |
| KR | 10-1000987 B1 | 12/2010 |
| KR | 10-1011626 B1 | 1/2011 |
| KR | 10-2012-0012580 A | 2/2012 |
| KR | 10-2012-0018937 A | 3/2012 |
| KR | 10-2012-0034464 A | 4/2012 |
| KR | 10-2015-0045258 A | 4/2015 |
| WO | WO-2020204990 A1 * | 10/2020 ............ G06F 1/3212 |

* cited by examiner

ELECTRONIC DEVICE FOR ADJUSTING TRANSMISSION RATE AND OPERATION METHOD THEREFOR

CROSS-REFERENCE TO RELATED APPLICATION(S)

This application is a continuation application, claiming priority under § 365(c), of an International application No. PCT/KR2021/006540, filed on May 26, 2021, which is based on and claims the benefit of a Korean patent application number 10-2020-0077191, filed on Jun. 24, 2020, in the Korean Intellectual Property Office, the disclosure of which is incorporated by reference herein in its entirety.

BACKGROUND

1. Field

The disclosure relates to a device and a method for adjusting a transmission rate in an electronic device.

2. Description of Related Art

An electronic device may perform wireless communication by transmitting and/or receiving data by using electromagnetic waves.

An electronic device (for example, a transmission device) may adaptively adjust a data transmission rate according to a radio wave environment in order to ensure efficient data transmission using wireless communication. For example, when signal attenuation to a reception device is relatively small, the transmission device may determine that a probability that data transmission to the reception device will fail is relatively low. Accordingly, the transmission device may adjust the data transmission rate to be relatively high in order to transmit a relatively large amount of data to the reception device. For example, when signal attenuation to the reception device is relatively high, the transmission device may determine that the probability that data transmission to the reception device will fail is relatively high. Accordingly, the transmission device may adjust the data transmission rate to be relatively low in order to increase the reliability of data transmission to the reception device.

The above information is presented as background information only to assist with an understanding of the disclosure. No determination has been made, and no assertion is made, as to whether any of the above might be applicable as prior art with regard to the disclosure.

SUMMARY

An electronic device (for example, transmission device) may select a transmission rate to be used for data transmission, based on expected throughput regarding multiple transmission rates available for data transmission. For example, when the expected throughput of a second transmission rate is higher than the expected throughput of a first transmission rate, the electronic device (for example, transmission device) may select the second transmission rate as the transmission rate to be used for data transmission.

Minimization of power consumption may be the most important factor in terms of a user of the electronic device, according to the manner in which the electronic device is used. For example, an augmented reality device (or wearable device) may require a scheme for reducing power consumption in order to satisfy the run time needed by the user.

However, when the electronic device (for example, a transmission device) selects a transmission rate to be used for data transmission, based on the expected throughput of the transmission rate, power consumed by wireless communication may increase. For example, when the electronic device (for example, the transmission device) selects a transmission rate to be used for data transmission, based on the expected throughput of the transmission rate, a data transmission rate may be selected such that, even if a specific ratio of data transmission fails, data can be transmitted at a relatively high transmission rate. If data transmission fails, the electronic device (for example, the transmission device) may retransmit corresponding data to the reception device. When the electronic device (for example, the transmission device) retransmits data, data retransmission may increase the active time of a wireless circuit (for example, wireless local area network (WLAN) module), thereby increasing power consumption.

Aspects of the disclosure are to address at least the above-mentioned problems and/or disadvantages and to provide at least the advantages described below. Accordingly, an aspect of the disclosure is to provide a device and a method for adjusting the data transmission rate, based on power consumed by wireless communication in an electronic device.

Additional aspects will be set forth in part in the description which follows and, in part, will be apparent from the description, or may be learned by practice of the presented embodiments.

In accordance with an aspect of the disclosure, an electronic device is provided. The electronic device includes a memory configured to store information related to a first transmission rate and a second transmission rate available for wireless communication, a communication circuit, and at least one processor operatively coupled to the memory and the communication circuit, wherein the at least one processor is configured to in case that wireless communication with an external electronic device is performed, identify expected first power consumption amount of a first transmission rate, based on the first transmission rate and a failure rate of data transmission related to the first transmission rate, and identify expected second power consumption amount of a second transmission rate, based on the second transmission rate and a failure rate of data transmission related to the second transmission rate, select, as a data transmission rate, the first transmission rate or the second transmission rate, based on the first power consumption amount and the second power consumption amount, and transmit data to the external electronic device, based on the selected first data transmission rate and the selected second data transmission rate.

In accordance with another aspect of the disclosure, a method for operating an electronic device is provided. The method includes in case that wireless communication with an external electronic device is performed, identifying an expected first power consumption amount of a first transmission rate, based on the first transmission rate and a failure rate of data transmission related to the first transmission rate, and identifying an expected second power consumption amount of a second transmission rate, based on the second transmission rate and a failure rate of data transmission related to the second transmission rate, selecting, as a data transmission rate, the first transmission rate or the second transmission rate, based on the first power consumption amount and the second power consumption amount, and transmitting data to the external electronic device, based on the selected first data transmission rate and the selected second data transmission data.

In accordance with another aspect of the disclosure, an electronic device is provided. The electronic device includes a memory configured to information related to a plurality of criteria for adjusting a transmission rate, a communication circuit, and at least one processor operatively connected to the memory and the communication circuit, wherein the at least one processor is configured to in case that wireless communication with an external electronic device is performed, identify context information of the electronic device, select one of the plurality of criteria, based on the context information of the electronic device, select a transmission rate, based on the selected criterion, and transmit data to the external electronic device, based on the selected transmission rate.

According to various embodiments of the disclosure, an electronic device (for example, transmission device) may adjust the data transmission rate, based on the expected amount of power consumption of a transmission rate available for wireless communication, thereby reducing power consumed by wireless communication in the electronic device.

According to various embodiments of the disclosure, an electronic device (for example, transmission device) may select a reference (for example, expected throughput or expected amount of power consumption) for adjusting the data transmission rate, based on context information of the electronic device, thereby transmitting data at a transmission rate appropriate for the context information of the electronic device.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
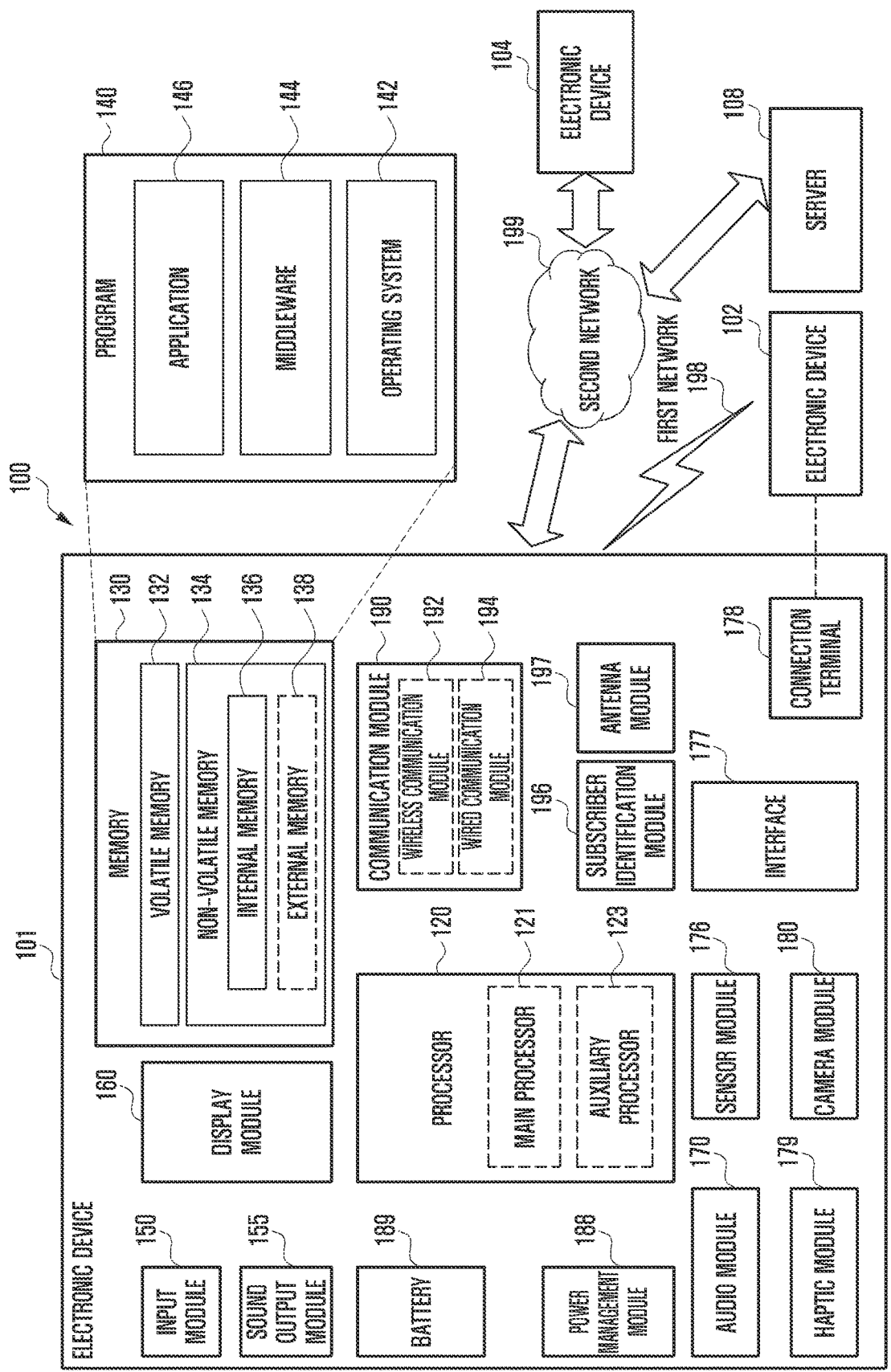
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an external electronic device 104 or a server 108 via a second network 199 (e.g., a long-range wireless communication network). In an embodiment, the electronic device 101 may communicate with the external electronic device 104 via the server 108. In another embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In other embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may be configured to control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, reinforcement learning, and the like. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), a digital pen (e.g., a stylus pen), and the like.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 160 may be configured to visually provide information to the outside (e.g., a user) of the electronic device 101. The display module 160 may include, for example, a display, a hologram device, or a projector and control circuitry to control a corresponding one of the display, hologram device, and projector. In an embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the external electronic device 102). In an embodiment, the connection terminal 178 may include, for example, a HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. In an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. In an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may be configured to support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC. The subscriber identification module 196 may include a plurality of subscriber identification modules. For example, the plurality of subscriber identification modules may store different subscriber information.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197. According to various embodiments, the antenna module 197 may form a high frequency band (e.g., mmWave) antenna module. In an embodiment, the high frequency band (e.g., mmWave) antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band. For example, the plurality of antennas may include a patch array antenna and/or a dipole array antenna. In another example, the plurality of antennas may include a patch array antenna and/or a dipole array antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to another embodiment, all or some of operations to be executed at the electronic device 101 may be executed at one or more of the external electronic devices 102 and 104 or the server 108. If the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. In an embodiment, the machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. In another embodiment, the computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
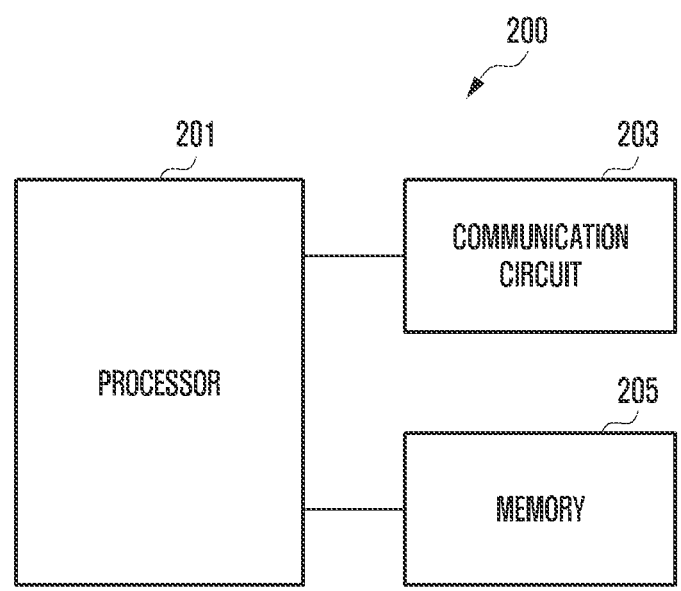
FIG. 2 is a block diagram of an electronic device for adjusting a transmission rate according to an embodiment of the disclosure.

FIG. 2 is a block diagram of an electronic device for adjusting a transmission rate according to an embodiment of the disclosure. For example, the electronic device 200 may be at least partially similar to the electronic device 101 of FIG. 1, or may include another embodiment of the electronic device 101.

Referring to FIG. 2, according to various embodiments, an electronic device 200 may include a processor (e.g., including processing circuitry) 201, a communication circuit 203, and/or a memory 205. In an embodiment, the processor 201 may be substantially the same as a processor 120 of FIG. 1 or may include the processor 120. The communication circuit 203 may be substantially the same as the wireless communication module 192 of FIG. 1, or may include the wireless communication module 192. The memory 205 may be substantially the same as a memory 130 of FIG. 1, or may include the memory 130. In another embodiment, the processor 201 may be operatively coupled to the communication circuit 203 and/or the memory 205.

According to various embodiments, the processor 201 may configure a transmission rate for transmitting data to an external electronic device (e.g., the electronic device 102 or 104 or the server 108 of FIG. 1) through the communication circuit 203. In an embodiment, the processor 201 may identify a plurality of transmission rates available for data transmission from the memory 205. The processor 201 may select a transmission rate to be used for transmitting data to the external electronic device from among the plurality of transmission rates, based on an expected power consumption amount of each transmission rate. The expected power consumption amount of the transmission rate is the amount of power expected to be consumed until the specified data is successfully transmitted to the external electronic device by using a specific transmission rate, and may be estimated based on the power consumption amount and the transmission failure rate of the electronic device 200 (e.g., the communication circuit 203) related to the specific transmission rate. The power consumption amount of the electronic device 200 (e.g., the communication circuit 203) related to the transmission rate may include the amount of power consumed by the electronic device 200 (e.g., the communication circuit 203) when data of a specified size is transmitted once at a specific transmission rate. The power consumption amount of the electronic device 200 (e.g., the communication circuit 203) related to the transmission rate may include the amount of power consumed by the electronic device 200 (e.g., the communication circuit 203) when a modulation and coding scheme (MCS) level, bandwidth, and/or number of spatial streams associated with a specific transmission rate is used in order to transmit data of a specified size to the external electronic device. For example, a data transmission rate of the electronic device 200 may be relatively increased as the MCS level is relatively high. In another example, a data transmission rate of the electronic device 200 may be relatively increased as the bandwidth is relatively large. For example, a data transmission rate of the electronic device 200 may be relatively increased as the number of spatial streams increases. For example, a transmission failure rate related to a transmission rate may include a probability of failure in data transmission when an MCS level, bandwidth, and/or number of spatial streams related to a specific transmission rate is used to transmit data to an external electronic device. For example, the power consumption amount may be relatively increased when the electronic device 200 increases the MCS level, increases the bandwidth, or increases the number of spatial streams. In another example, the power consumption amount generated by the electronic device 200 increasing the bandwidth or the number of spatial streams may increase relatively compared to the power consumption amount generated by the electronic device 200 increasing the MCS level.

According to other embodiments, the processor 201 may select a transmission rate to be used for transmitting data to the external electronic device from among a plurality of transmission rates, based on an expected throughput and/or an expected power consumption amount for each of a plurality of transmission rates available for data transmission.

In an embodiment, the processor 201 may select a transmission rate that satisfies a specified power consumption amount from among a plurality of transmission rates that satisfy a specified throughput. For example, the processor 201 may detect, as a candidate transmission rate, one or more transmission rates that satisfy a specified throughput among a plurality of transmission rates. The processor 201 may select a transmission rate to be used for data transmission to the external electronic device from among the candidate transmission rates, based on the expected power consumption amount of the candidate transmission rate. Among the candidate transmission rates, a transmission rate with the lowest expected power consumption amount may be selected as a transmission rate to be used for data transmission. For example, the candidate transmission rate may include one or more transmission rates at which an expected throughput of the transmission rate exceeds a specified throughput.

In another embodiment, the processor 201 may select a transmission rate that satisfies the specified throughput from among a plurality of transmission rates that satisfy the specified power consumption amount. The processor 201 may detect, as a candidate transmission rate, at least one transmission rate that satisfies the specified power consumption amount among a plurality of transmission rates. The processor 201 may select a transmission rate to be used for transmitting data to the external electronic device from among the candidate transmission rates, based on the expected throughput of the candidate transmission rate. For example, a transmission rate with the highest expected throughput among the candidate transmission rates may be selected as a transmission rate to be used for data transmission. The candidate transmission rate may include at least one transmission rate at which an expected power consumption amount of the transmission rate is equal to or less than a specified power consumption amount. For example, the expected throughput of the transmission rate is a throughput by which data transmission to an external electronic device is successful by using a specific transmission rate for a specified time, and may be estimated based on a transmission failure rate related to the transmission rate.

According to various embodiments, the processor 201 may configure an adjustment criterion for a transmission rate for transmitting data to an external electronic device (e.g., the electronic device 102 or 104 or the server 108 of FIG. 1) through the communication circuit 203. In yet another embodiment, the processor 201 may configure an adjustment criterion for a transmission rate to be used for data transmission, based on the context information of the electronic device 200 and/or the context information of the external electronic device. For example, the context information of the electronic device 200 (or an external electronic device) may include at least one of a battery status (e.g., a remaining amount of a battery) of the electronic device 200 (or the external electronic device), whether the electronic device 200 (or the external electronic device) is charged, a type of the electronic device 200 (or the external electronic device), a service type of the electronic device 200 (or then external electronic device), a type of application or service being executed in the electronic device 200 (or the external electronic device), or a state (e.g., a rollable or foldable state of a display) of the display module (e.g., the display module 160 of FIG. 1) of the electronic device 200. The adjustment criterion for a transmission rate may include at least one of an expected throughput of the transmission rate, an expected power consumption amount, or expected quality information (e.g., quality of service (QoS)).

According to an embodiment, the electronic device 200 may include a display module (e.g., the display module 160 of FIG. 1) (not shown) including a rollable, slidable, stretchable, or foldable display. For example, the electronic device 200 may have the display, the resolution of which changes based on a rollable, slidable, stretchable, or foldable state of the display. For example, in the electronic device 200, the amount of data transmission required by the electronic device 200 or the amount of power consumed by the electronic device 200 may change based on the change in the resolution. The rollable, slidable, stretchable, or foldable state of the display may include a state in which the size of the display area of the display included in the display module of the electronic device 200 is enlarged or reduced, based on the structural change of the electronic device 200.

According to another embodiment, the processor 201 may configure an adjustment criterion for a transmission rate to be used for data transmission to the external electronic device, by interworking with an external electronic device to which wireless communication is established through the communication circuit 203. For example, the processor 201 may control the communication circuit 203 to transmit information related to one or more adjustment criteria supportable by the electronic device 200 to the external electronic device. In another example, the processor 201 may configure an adjustment criterion for a transmission rate to be used to transmit data to the external electronic device, based on a response signal received from the external electronic device in response to the information related to the one or more adjustment criteria. For example, the external electronic device may select one or more adjustment criteria from among one or more adjustment criterions supportable by the electronic device 200, based on context information of the external electronic device. In another example, the external electronic device may transmit, to the electronic device 200, a response signal including information related to one or more adjustment criteria selected based on the context information of the external electronic device.

According to other embodiments, the communication circuit 203 may perform wireless communication with an external electronic device (e.g., the electronic device 102 or 104 or the server 108 of FIG. 1). In an embodiment, the communication circuit 203 may transmit and/or receive a control message and/or data to and from an external electronic device through wireless communication. For example, the wireless communication may include short-range communication and/or cellular communication. The short-range communication may include at least one of a wireless local area network (WLAN), Bluetooth, Bluetooth low energy (BLE), and infrared data association (IrDA). The cellular communication may include any one of 4th generation mobile communication schemes (e.g., long-term evolution (LTE), LTE-advanced (LTE-A), LTE-A pro (LTE advanced pro)) or any once of 5th generation mobile communication schemes (e.g., 5G or NR). According to an embodiment, the communication circuit 510 may include a communication processor related to wireless communication, a radio frequency integrated circuit (RFIC), and/or a radio frequency front end (RFFE).

According to various embodiments, the memory 205 may store various data used by at least one component (e.g., the processor 201 or the communication circuit 203) of the electronic device 200. In an example, the data may include at least one of information related to the adjustment criterion for a transmission rate or information related to at least one transmission rate available for data transmission. The information related to the transmission rate may include information related to an MCS level, a bandwidth, and/or the number of spatial streams related to a specific transmission rate.

According to other embodiments, the electronic device 200 and/or the external electronic device may include various types of devices. For example, the electronic device 200 and/or the external electronic device may include a portable communication device (e.g., a smartphone), a computer device, a portable multimedia device, a portable medical device, a camera, a wearable device (e.g., AR glass), or a home appliance. In an embodiment, the electronic device according to an embodiment is not limited to the above-described devices.

According to some embodiments, the electronic device (e.g., the electronic device 101 of FIG. 1 or the electronic device 200 of FIG. 2) may include: a memory (e.g., the memory 130 of FIG. 1 or the memory 205 of FIG. 2) configured to store information related to a first transmission rate and a second transmission rate available for wireless communication; a communication circuit (e.g., the wireless communication module 192 of FIG. 1 or the communication circuit 203 of FIG. 2); and a processor (e.g., the processor 120 of FIG. 1 or processor 201 of FIG. 2) operatively coupled to the memory and the communication circuit, wherein the processor is configured to: in case that wireless communication with an external electronic device is performed, identify an expected first power consumption amount of a first transmission rate, based on the first transmission rate and a failure rate of data transmission related to the first transmission rate, and identify an expected second power consumption amount of a second transmission rate, based on the second transmission rate and a failure rate of data transmission related to the second transmission rate; select, as a data transmission rate, the first transmission rate or the second transmission rate, based on the first power consumption amount and the second power consumption amount; and transmit data to the external electronic device, based on the selected data transmission rate.

According to other embodiments, the processor may be configured to: estimate the first power consumption amount expected based on the first transmission rate to be consumed until the data transmission to the external electronic device is successful, based on the first transmission rate, a failure rate of data transmission related to the first transmission rate, and an amount of power consumed based on the first transmission rate by the electronic device to transmit data once; and estimate the second power consumption amount expected based on the second transmission rate to be consumed until the data transmission to the external electronic device is successful, based on the second transmission rate, a failure rate of data transmission related to the second transmission rate, and an amount of power consumed based on the second transmission rate by the electronic device to transmit data once.

The processor may be configured to: select the first transmission rate as the data transmission rate in case that the first power consumption amount is less than the second power consumption amount; and select the second transmission rate as the data transmission rate in case that the second power consumption amount is less than the first power consumption amount.

In an embodiment, the processor may be configured to: identify an expected first throughput of the first transmission rate and an expected second throughput of the second transmission rate; and select the data transmission rate, based on the first throughput and the first power consumption amount related to the first transmission rate, and the second throughput and the second power consumption amount related to the second transmission rate.

In another embodiment, the processor may be configured to: configure, as a candidate transmission rate, at least one of the first transmission rate or the second transmission rate, based on the first throughput and the second throughput; and select, as the data transmission rate, a candidate transmission rate that satisfies a specified power consumption amount among the at least one candidate transmission rate.

In yet another embodiment, the processor may be configured to: configure, as a candidate transmission rate, at least one of the first transmission rate and the second transmission rate, based on the first power consumption amount and the second power consumption amount; and select, as the data transmission rate, a candidate transmission rate that satisfies a specified throughput among the at least one candidate transmission rate.

In still another embodiment, the processor may be configured to: estimate, based on the first transmission rate and a failure rate of data transmission related to the first transmission rate, the first throughput expected for a specified time based on the first transmission rate, by which data may be transmitted to the external electronic device; and estimate, based on the second transmission rate and a failure rate of data transmission related to the second transmission rate, the second throughput expected for a specified time based on the second transmission rate, by which data may be transmitted to the external electronic device.

According to other embodiments, the electronic device (e.g., the electronic device 101 of FIG. 1 or the electronic device 200 of FIG. 2) may include: a memory (e.g., the memory 130 of FIG. 1 or the memory 205 of FIG. 2) configured to information related to a plurality of criteria for adjusting a transmission rate; a communication circuit (e.g., the wireless communication module 192 of FIG. 1 or the communication circuit 203 of FIG. 2); and processor (e.g., the processor 120 of FIG. 1 or the processor 201 of FIG. 2) operatively connected to the memory and the communication circuit, wherein the processor is configured to: in case that wireless communication with an external electronic device is performed, identify context information of the electronic device; select one of the plurality of criteria, based on the context information of the electronic device; select a transmission rate, based on the selected criterion; and transmit data to the external electronic device, based on the selected transmission rate.

According to some embodiments, the plurality of criteria may include at least one of a power consumption amount expected based on the transmission rate to be consumed until data transmission to the external electronic device is successful, a throughput expected for a specified time based on the transmission rate, by which data may be transmitted to the external electronic device, or quality expected based on the transmission rate to be obtained by transmitting data to the external electronic device.

In an embodiment, the context information of the electronic device may include at least one of a battery status of the electronic device, whether the electronic device is charged, a type of the electronic device, a service type of the electronic device, a type of application being executed in the electronic device, or a state (e.g., a rollable or foldable state of a display) of the display module (e.g., the display module 160 of FIG. 1) of the electronic device.

In another embodiment, the processor may select one of the plurality of criteria, based on the context information of the external electronic device and the context information of the electronic device, received from the external electronic device through the communication circuit.

In yet another embodiment, the context information of the external electronic device may be received from the external electronic device at the time of wireless communication connection of the external electronic device or while performing wireless communication with the external electronic device.

In still another embodiment, the communication circuit may support wireless local area network (WLAN) or new radio (NR) communication.

Figure 3:
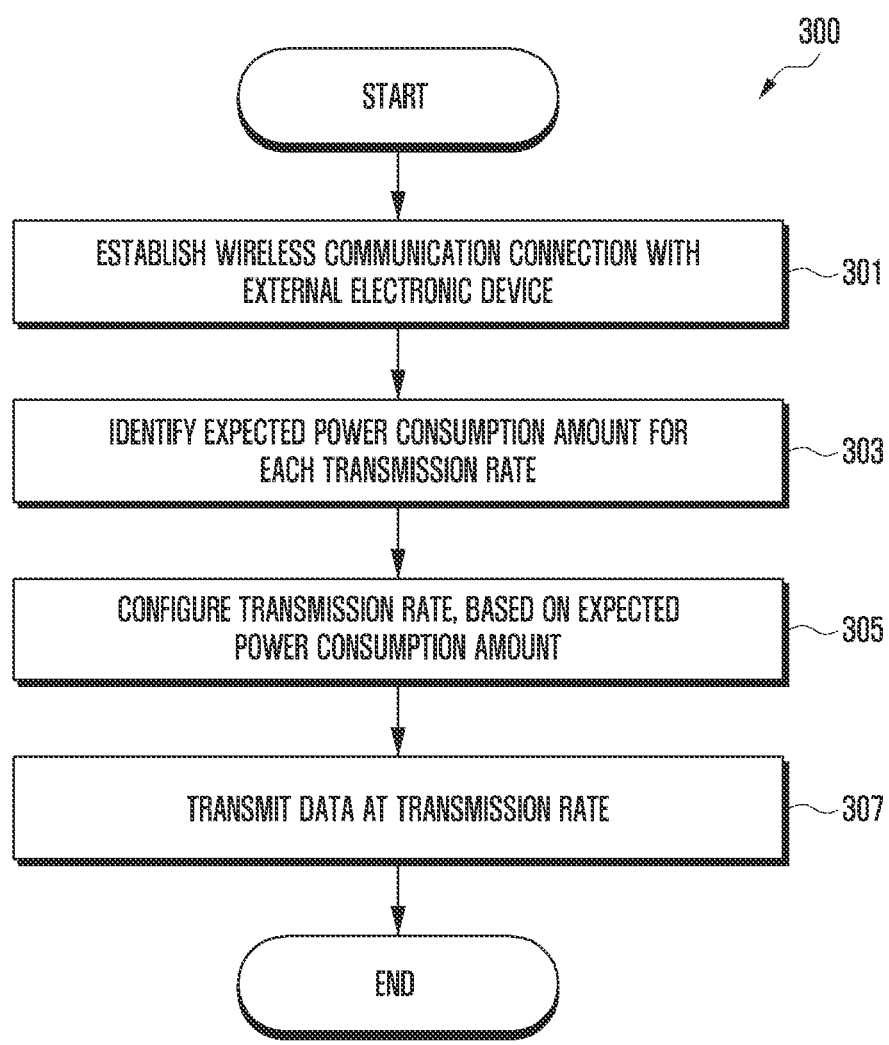
FIG. 3 is a flowchart for adjusting a transmission rate, based on a power consumption amount in an electronic device according to an embodiment of the disclosure.

FIG. 3 is a flowchart 300 for adjusting a transmission rate, based on a power consumption amount in an electronic device according to an embodiment of the disclosure. In the following embodiment, each operation may be performed sequentially, but is not necessarily performed sequentially. For example, the order of each operation may be changed, and at least two operations may be performed in parallel. In another example, the electronic device may be the electronic device 101 of FIG. 1 or the electronic device 200 of FIG. 2.

Referring to FIG. 3, according to various embodiments, an electronic device (e.g., the processor 120 of FIG. 1, a wireless communication module 192 of FIG. 1, a processor 201 of FIG. 2, or a communication circuit 203 of FIG. 2) may connect wireless communication to an external electronic device (e.g., a electronic device 102 or 104 or a server 108 of FIG. 1) in operation 301. According to an embodiment, the communication circuit 203 may establish a wireless communication link with an external electronic device. For example, the wireless communication may include short-range communication (e.g., Wi-Fi, Bluetooth, BLE, IrDA, and the like) and/or cellular communication (e.g., 4th generation mobile communication, 5th generation mobile communication, and the like).

According to various embodiments, the electronic device (e.g., the processor 120 or 201, the wireless communication module 192, or the communication circuit 203) may identify an expected power consumption amount of each transmission rate available for data transmission in operation 303. According to an embodiment, the processor 201 may acquire information related to a plurality of transmission rates available for transmitting data stored in the memory 205. In an embodiment, the processor 201 may identify the expected power consumption amount of each transmission rate available for data transmission. For example, the processor 201 may estimate the expected power consumption amount of $(i)^{th}$ transmission rate, based on the (i)th transmission rate and a transmission failure rate when data is transmitted at the (i)th transmission rate. The transmission failure rate when data is transmitted at the (i)th transmission rate may include a transmission failure rate when a combination of a MCS level, a bandwidth, and/or the number of spatial streams related to the (i)th transmission rate is desired to be used. For example, the expected power consumption amount of the (i)th transmission rate may include the amount of power expected to be consumed until designated data is successfully transmitted to the external electronic device by using the (i)th transmission rate. For example, the expected power consumption amount of the (i)th transmission rate may be estimated based on Equation 1.

$$\frac{p_i}{r_i} \times \frac{1}{1-FER_I} \quad \text{Equation 1}$$

For example, $r_i$ may denote a transmission rate, $p_i$ may denote an amount of power consumed by the electronic device 200 (e.g., the communication circuit 203) when data is transmitted once at a transmission rate of $r_i$, $FER_1$ (frame error rate) may denote a probability of failure in transmission when data is transmitted at a transmission rate of $r_i$. For example, $$\frac{1}{1-FER_I}$$

may include an expected value of the number of transmission attempts required until first successful data transmission using the transmission rate of $r_i$ modeled based on a geometric random variable.

$$\frac{1}{r_i}$$

may include a normalized transmission time required to transmit designated data at a time at a transmission rate of $$r_i \cdot \frac{1}{r_i} \times \frac{1}{1-FER_I}$$

may include a normalized transmission time required until designated data is successfully transmitted using the transmission rate of $r_i$. For example, i may include an integer greater than 1 as an index of a transmission rate available for data transmission in the electronic device 200.

In an embodiment, in operation 305, the electronic device (e.g., the processor 120 or 201, the wireless communication module 192, or the communication circuit 203) may configure a transmission rate to be used for data transmission, based on the expected power of each transmission rate available for data transmission. In another embodiment, the processor 201 may select a transmission rate that satisfies a specified condition among a plurality of transmission rates available for data transmission as a transmission rate to be used for transmitting data to the external electronic device. For example, a transmission rate satisfying a specified condition may include a transmission rate with the lowest expected power consumption amount.

According to other embodiments, in operation 307, the electronic device (e.g., the processor 120 or 201, the wireless communication module 192, or the communication circuit 203) may transmit data to an external electronic device, based on the transmission rate configured to be used for data transmission. In yet another embodiment, the communication circuit 203 may transmit data to the external electronic device by using a MCS level, a bandwidth, and/or the number of spatial streams related to the transmission rate to be used for data transmission and configured in operation 305.

According to some embodiments, an electronic device (e.g., the electronic device 101 of FIG. 1 or the electronic device 200 of FIG. 2) and an external electronic device (e.g., the electronic device 102 or 104 of FIG. 1 or the server 108), to which wireless communication is established, may configure a data transmission rate independently of each other. In an embodiment, the electronic device may transmit data to the external electronic device by using a first transmission rate configured based on the expected power consumption amount for each transmission rate supportable by the electronic device. In another embodiment, the external electronic device may transmit data to the electronic device by using a second transmission rate configured based on the expected power consumption amount for each transmission rate supportable by the external electronic device. The first transmission rate and the second transmission rate may include the same or different transmission rates.

In an embodiment, in case that the electronic device (e.g., the processor 120 or 201, the wireless communication module 192, or the communication circuit 203) performs wireless communication with an external electronic device through a plurality of wireless communication channels, the electronic device may identically or independently configure a transmission rate for transmitting data through each wireless communication channel.

In another embodiment, the electronic device (e.g., the processor 120 or 201, the wireless communication module 192, or the communication circuit 203) may configure a transmission rate required for data transmission from the external electronic device to the electronic device. According to an embodiment, the processor 201 may receive information related to the transmission rate supportable by the external electronic device from the external electronic device through the communication circuit 203. The processor 201 may select, as the transmission rate of the external electronic device, a transmission rate that satisfies a specified condition (e.g., a transmission rate with the lowest power consumption amount) among the transmission rates supportable by the external electronic device. In yet another embodiment, the processor 201 may control the communication circuit 203 such that information related to the transmission rate of the external electronic device is transmitted to the external electronic device. For example, the transmission rate of the external electronic device may include a transmission rate used by the external electronic device to transmit data to the electronic device.

Figure 4:
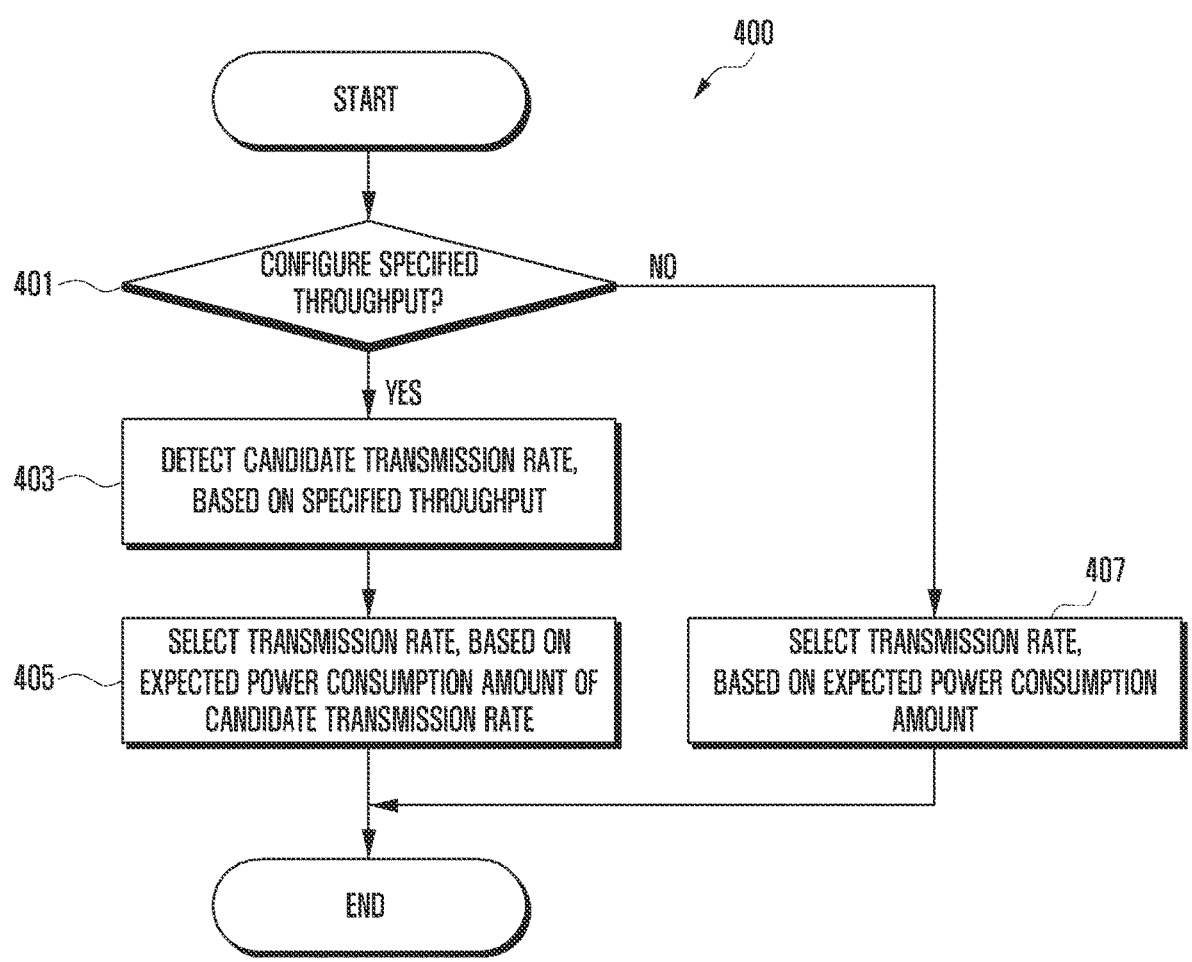
FIG. 4 is an example for selecting a transmission rate, based on a throughput and a power consumption amount in an electronic device according to an embodiment of the disclosure.

FIG. 4 is an example 400 for selecting a transmission rate, based on a throughput and a power consumption amount in an electronic device according to an embodiment of the disclosure. According to an embodiment, the operations of FIG. 4 may be detailed operations of operation 305 of FIG. 3. In the following embodiment, each operation may be performed sequentially, but is not necessarily performed sequentially. The order of each operation may be changed, and at least two operations may be performed in parallel. For example, the electronic device may be the electronic device 101 of FIG. 1 or the electronic device 200 of FIG. 2.

Referring to FIG. 4, according to various embodiments, when an expected power consumption amount of a transmission rate available for data transmission is identified (e.g., operation 303 of FIG. 3), an electronic device (e.g., the processor 120 of FIG. 1, a wireless communication module 192 of FIG. 1, a processor 201 of FIG. 2, or a communication circuit 203 of FIG. 2) may identify in operation 401 whether a specified throughput for configuring the transmission rate is configured. The specified throughput may include a minimum throughput as a criterion for configuring a transmission rate. According to an embodiment, the specified throughput may be determined based on an application or service executed in the electronic device. For example, the specified throughput may be determined based on audio data quality, video data quality, or transmission completion request time required by the electronic device.

According to an embodiment, when a specified throughput for configuring a transmission rate is identified (e.g., "YES" in operation 401), the electronic device (e.g., the processor 120 or 201, the wireless communication module 192, or the communication circuit 203) may detect at least one candidate transmission rate, based on the specified throughput in operation 403. According to another embodiment, the processor 201 may identify an expected throughput of each of a plurality of transmission rates available for data transmission. The expected throughput of the transmission rate is a throughput expected by which data transmission to an external electronic device is successful by using a specific transmission rate for a specified time, and may be estimated based on a transmission failure rate related to the transmission rate. According to yet another embodiment, the processor 201 may select, as a candidate transmission rate, at least one transmission rate at which an expected throughput satisfies a specified throughput, among a plurality of transmission rates. The processor 201 may select, as a candidate transmission rate, at least one transmission rate at which an expected throughput exceeds a specified throughput, among the plurality of transmission rates.

According to various embodiments, in operation 405, the electronic device (e.g., the processor 120 or 201, the wireless communication module 192, or the communication circuit 203) may select a transmission rate to be used for data transmission, based on the expected power consumption amount of at least one candidate transmission rate. In an embodiment, the processor 201 may select, as a transmission rate to be used for data transmission, a transmission rate with the lowest expected power consumption amount, among the at least one candidate transmission rate.

According to other embodiments, when the specified throughput for configuring a transmission rate is not configured (e.g., "NO" in operation 401), in operation 407, the electronic device (e.g., the processor 120 or 201, the wireless communication module 192, or the communication circuit 203) may select a transmission rate to be used for data transmission, based on the expected power consumption amount of a plurality of transmission rates available for data transmission. In another embodiment, the processor 201 may select, as a transmission rate to be used for data transmission, a transmission rate with the lowest expected power consumption amount, among a plurality of transmission rates available for data transmission.

Figure 5:
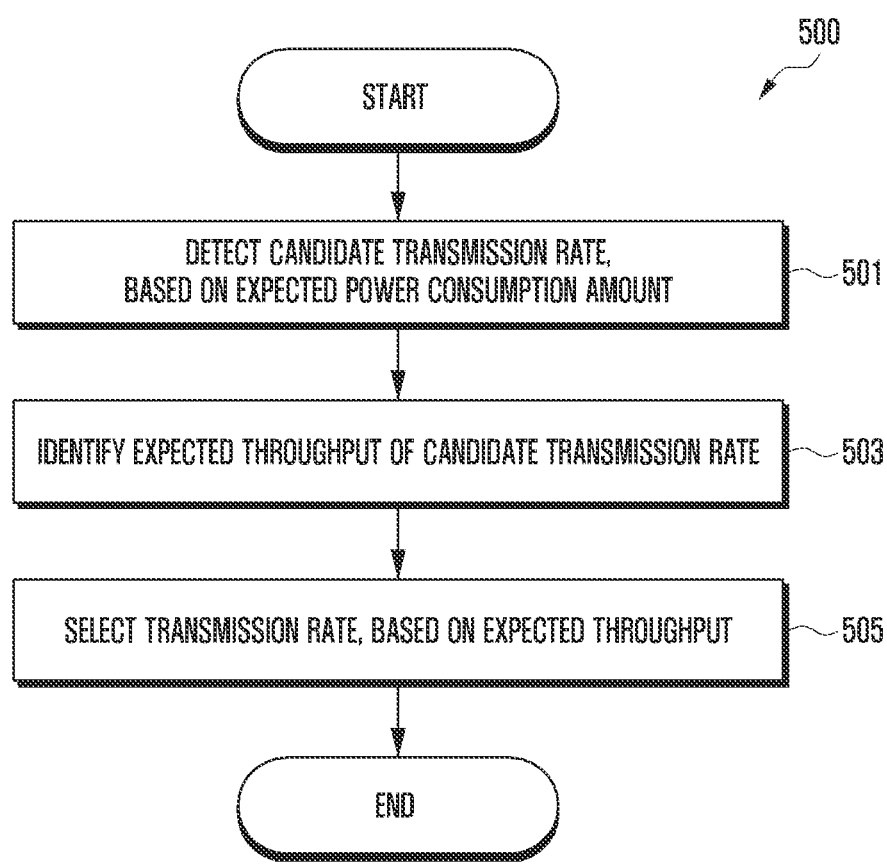
FIG. 5 is another example for selecting a transmission rate based on a throughput and a power consumption amount in an electronic device according to an embodiment of the disclosure.

FIG. 5 is another example 500 for selecting a transmission rate, based on a throughput and a power consumption amount in an electronic device according to an embodiment of the disclosure. According to an embodiment, the operations of FIG. 5 may be detailed operations of operation 305 of FIG. 3. In the following embodiment, each operation may be performed sequentially, but is not necessarily performed sequentially. The order of each operation may be changed, and at least two operations may be performed in parallel. For example, the electronic device may be the electronic device 101 of FIG. 1 or the electronic device 200 of FIG. 2.

Referring to FIG. 5, according to various embodiments, when an expected power consumption amount of a transmission rate available for data transmission is identified (e.g., operation 303 in FIG. 3), in operation 501, an electronic device (e.g., a processor 120 of FIG. 1, a wireless communication module 192, a processor 201 of FIG. 2, or a communication circuit 203 of FIG. 2) may detect at least on candidate transmission rate, based on the expected power consumption amount of each of a plurality of transmission rates available for data transmission. For example, the processor 201 may detect, as a candidate transmission rate, at least one transmission rate that satisfies a specified power consumption amount, among expected power consumption amounts of the plurality of transmission rates available for data transmission. For example, the specified power consumption amount may include a maximum power consumption amount as a criterion for configuring a candidate transmission rate. The transmission rate satisfying the specified power consumption amount may include a transmission rate at which an expected power consumption amount is equal to or less than the specified power consumption amount.

In an embodiment, the electronic device (e.g., the processor 120 or 201, the wireless communication module 192, or the communication circuit 203) may identify the expected throughput of each of the at least one candidate transmission rate in operation 503. In another embodiment, the processor 201 may estimate an expected throughput of the candidate transmission rate, based on a transmission failure rate related to the candidate transmission rate. For example, the expected throughput of the transmission rate may include a throughput expected by which data transmission to the external electronic device is successful by using a specific transmission rate for a specified time.

According to other embodiments, in operation 505, the electronic device (e.g., the processor 120 or 201, the wireless communication module 192, or the communication circuit 203) may select a transmission rate to be used for data transmission, based on the expected throughput of at least one candidate transmission rate. In yet another embodiment, the processor 201 may select, as a transmission rate to be used for data transmission, a transmission rate with the highest expected throughput, among at least one candidate transmission rate.

Figure 6:
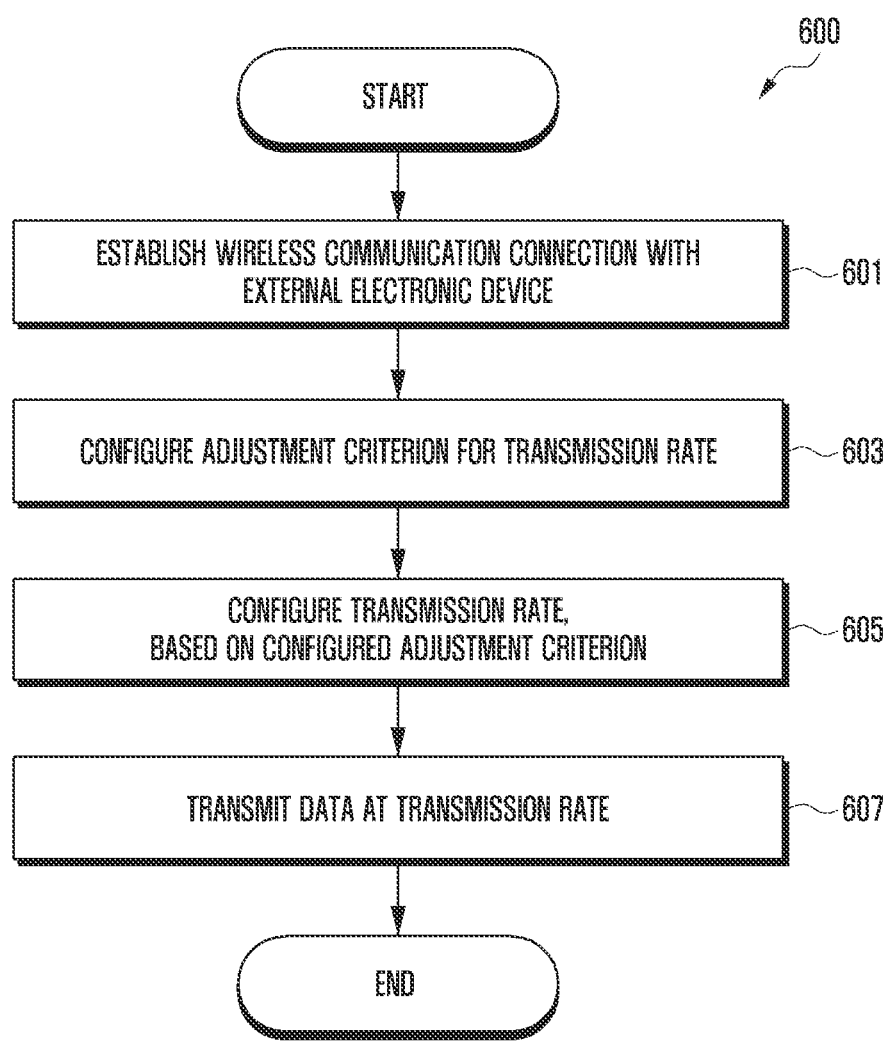
FIG. 6 is a flowchart for configuring an adjustment criterion for a transmission rate in an electronic device according to an embodiment of the disclosure.

FIG. 6 is a flowchart 600 for configuring an adjustment criterion for a transmission rate in an electronic device according to an embodiment of the disclosure. In the following embodiment, each operation may be performed sequentially, but is not necessarily performed sequentially. For example, the order of each operation may be changed, and at least two operations may be performed in parallel. For example, the electronic device may be the electronic device 101 of FIG. 1 or the electronic device 200 of FIG. 2.

Referring to FIG. 6, according to various embodiments, an electronic device (e.g., a processor 120 of FIG. 1, a wireless communication module 192 of FIG. 1, a processor 201 of FIG. 2, or a communication circuit 203 of FIG. 2) may establish wireless communication connection with to an external electronic device (e.g., an electronic device 102 or 104 or a server 108 of FIG. 1) in operation 601. According to an embodiment, the processor 201 may control the communication circuit 203 to establish a wireless communication link with an external electronic device. For example, the wireless communication may include short-range communication (e.g., WiFi, Bluetooth, BLE, IrDA) and/or cellular communication (e.g., 4th generation mobile communication or 5th generation mobile communication).

According to various embodiments, the electronic device (e.g., the processor 120 or 201, the wireless communication module 192, or the communication circuit 203) may configure an adjustment criterion for a transmission rate in operation 603. In an embodiment, the processor 201 may identify, in the memory 205, adjustment criteria for a plurality of transmission rates available in the electronic device 200. For example, the processor 201 may select an adjustment criterion for a transmission rate to be used for data transmission from among adjustment criteria for a plurality of transmission rates, based on context information of the electronic device 200. As another example, the processor 201 may select an adjustment criterion for a transmission rate to be used for data transmission from among adjustment criteria for a plurality of transmission rates, based on context information of an external electronic device to which wireless communication is established. The context information of the electronic device (or an external electronic device) may include at least one of a battery status (e.g., a remaining amount of a battery) of the electronic device (or the external electronic device), whether the electronic device (or the external electronic device) is charged, a type of the electronic device (or the external electronic device), a service type of the electronic device (or then external electronic device), a type of application or service being executed in the electronic device (or the external electronic device), or a state (e.g., a rollable or foldable state of a display) of the display module (e.g., the display module 160 of FIG. 1) of the electronic device. The adjustment criterion for the transmission rate may include at least one of an expected throughput of the transmission rate, an expected power consumption amount, or expected quality information (e.g., quality of service (QoS)).

According to other embodiments, in operation 605, the electronic device (e.g., the processor 120 or 201, the wireless communication module 192, or the communication circuit 203) may configure a transmission rate to be used for data transmission, based on a configured adjustment criterion for the transmission rate. In an embodiment, when the expected power consumption amount of the transmission rate is selected as the adjustment criterion for the transmission rate, as in operations 301 to 307 of FIG. 3, the processor 201 may select, as a transmission rate to be used for data transmission, the transmission rate at which the expected power consumption amount satisfies a specified condition. In another embodiment, when the expected power consumption amount and the expected throughput of the transmission rate are selected as the adjustment criteria for the transmission rate, as in operations 401 to 405 of FIG. 4 or operations 501 to 505 of FIG. 5, the processor 201 may select, as a transmission rate to be used for data transmission, the transmission rate at which the expected power consumption amount and the expected throughput satisfy specified conditions (e.g., a specified power consumption amount and a specified throughput).

According to various embodiments, in operation 607, the electronic device (e.g., the processor 120 or 201, the wireless communication module 192, or the communication circuit 203) may transmit data to the external electronic device, based on a transmission rate configured to be used for data transmission. According to another embodiment, the processor 201 may control the communication circuit 203 such that data is transmitted to the external electronic device by using the MCS level, the bandwidth, and/or the number of spatial streams related to the transmission rate to be used for data transmission configured in operation 605.

Figure 7:
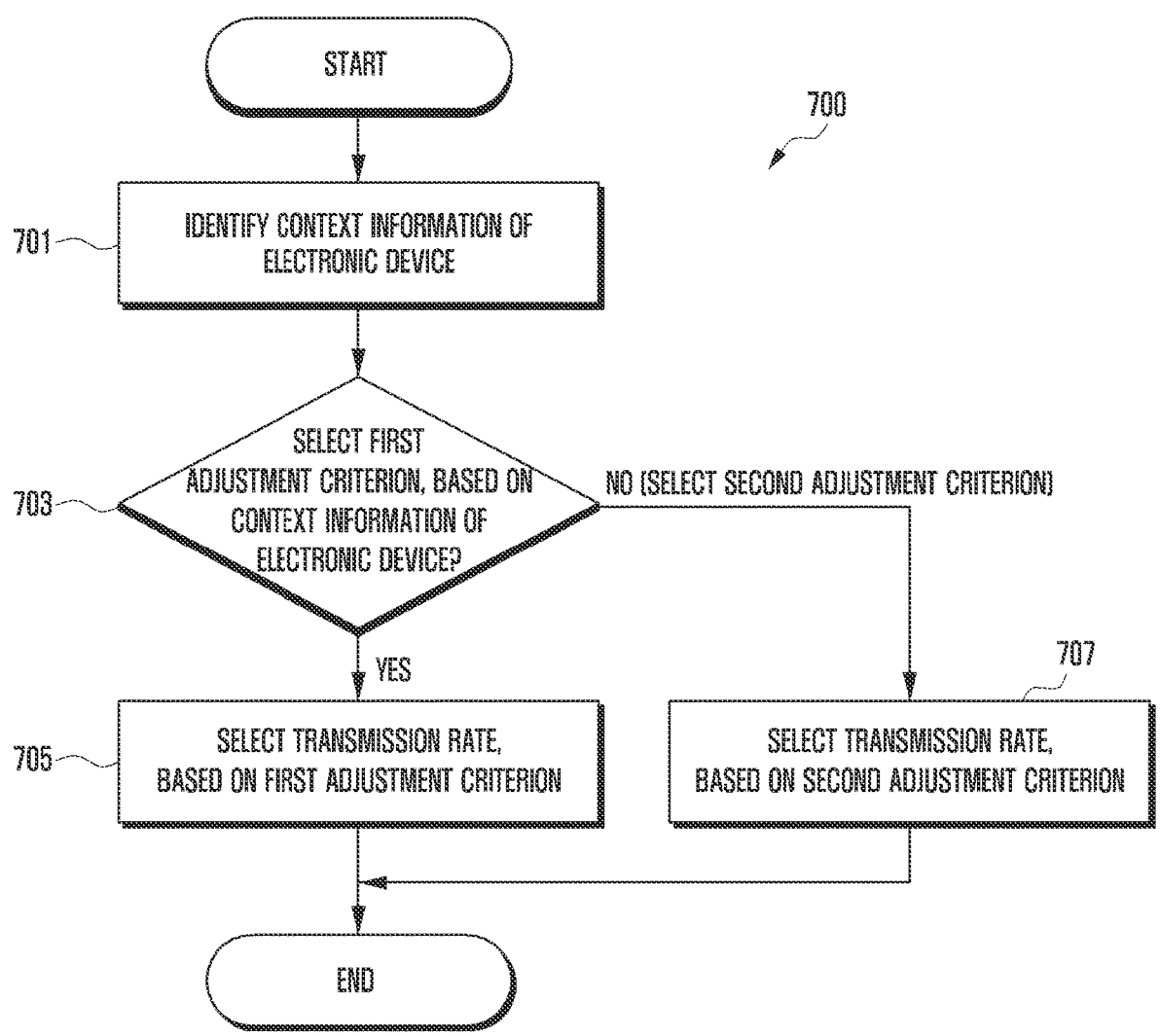
FIG. 7 is a flowchart for selecting a transmission rate, based on an adjustment criterion for a transmission rate in an electronic device according to an embodiment of the disclosure.

FIG. 7 is a flowchart 700 for selecting a transmission rate, based on an adjustment criterion for transmission rate in an electronic device according to an embodiment of the disclosure. According to an embodiment, the operations of FIG. 7 may be detailed operations of operations 603 and 605 of FIG. 6. In the following embodiment, each operation may be performed sequentially, but is not necessarily performed sequentially. The order of each operation may be changed, and at least two operations may be performed in parallel. For example, the electronic device may be the electronic device 101 of FIG. 1 or the electronic device 200 of FIG. 2.

Referring to FIG. 7, according to various embodiments, when an electronic device (e.g., a processor 120 of FIG. 1, a wireless communication module 192, a processor 201 of FIG. 2, or a communication circuit 203 of FIG. 2) is connected to an external electronic device through wireless communication (e.g., operation 601 of FIG. 6), the electronic device may identify context information of the electronic device 200 in operation 701. For example, the context information of an electronic device 200 may include at least one of a battery status (e.g., a remaining amount of a battery) of the electronic device 200, whether the electronic device 200 is charged, a type of the electronic device 200, a service type of the electronic device 200, a type of application or service being executed in the electronic device 200, or a rollable, slidable, stretchable or foldable state of a display included in the display module (e.g., a display module 160 of FIG. 1) of the electronic device 200.

According to various embodiments, in operation 703, the electronic device (e.g., the processor 120 or 201, the wireless communication module 192, or the communication circuit 203) may identify whether a first adjustment criterion (e.g., an expected power consumption amount) is selected among the plurality of adjustment criteria, based on the context information of the electronic device 200. In an embodiment, the processor 201 may configure the adjustment criterion for a transmission rate, based on the battery status of the electronic device 200 and/or whether the electronic device 200 is charged. For example, when the remaining amount of the battery of the electronic device 200 satisfies the specified remaining amount, the processor 201 may select the first adjustment criterion as the adjustment criterion for the transmission rate. The state in which the remaining amount of the battery satisfies the specified remaining amount may include a state in which the remaining amount of the battery of the electronic device 200 is equal to or less than the specified remaining amount. In another example, when the remaining amount of the battery of the electronic device 200 satisfies a specified remaining amount and the battery of the electronic device 200 is not charged, the processor 201 may select the first adjustment criterion (e.g., an expected power consumption amount) as an adjustment criterion for data transmission. For example, when the remaining amount of the battery of the electronic device 200 does not satisfy the specified remaining amount and/or the battery of the electronic device 200 is being charged, the processor 201 may select a second adjustment (e.g., an expected throughput) as an adjustment criterion for the transmission rate. In an example, the state in which the remaining amount of the battery does not satisfy the specified remaining amount may include a state in which the remaining amount of the battery of the electronic device 200 exceeds the specified remaining amount. For example, when the remaining amount of the battery of the electronic device 200 satisfies the specified remaining amount while the battery of the electronic device 200 is being charged, the processor 201 may select the second adjustment criterion (e.g., an expected throughput) as an adjustment criterion for a transmission rate.

In an embodiment, the processor 201 may configure an adjustment criterion for a transmission rate, based on at least one of a type of the electronic device 200, a service type of the electronic device 200, and/or a type of an application or service being executed in the electronic device 200. The processor 201 may identify a driving time required by the electronic device 200, based on at least one of a type of the electronic device 200, a service type of the electronic device 200, and/or a type of an application or service being executed in the electronic device 200. For example, when the driving time required by the electronic device 200 satisfies a specified driving time, the processor 201 may select the first adjustment criterion as the adjustment criterion for a transmission rate. In an example, a state in which the driving time required by the electronic device 200 satisfies the specified driving time may include a state in which the driving time required by the electronic device 200 is equal to or less than the specified driving time. For example, when the driving time required by the electronic device 200 does not satisfy the specified driving time, the processor 201 may select the second adjustment criterion as the adjustment criterion for a transmission rate. The state in which the driving time required by the electronic device 200 does not satisfy the specified driving time may include a state in which the driving time required by the electronic device 200 exceeds the specified driving time.

According to various embodiments, when the first adjustment criterion (e.g., an expected power consumption amount) is selected based on the context information of the electronic device 200 (e.g., "YES" in operation 703), in operation 705, the electronic device (e.g., the processor 120 or 201, the wireless communication module 192, or the communication circuit 203) may select a transmission rate to be used for data transmission, based on the first adjustment criterion (e.g., an expected power consumption amount). According to another embodiment, as in operations 301 to 307 of FIG. 3, the processor 201 may select a transmission rate to be used for data transmission, based on an expected power consumption amount.

According to other embodiments, when the first adjustment criterion (e.g., an expected power consumption amount) is not selected based on the context information of the electronic device 200 (e.g., "NO" in operation 703), in operation 707, the electronic device (e.g., the processor 120 or 201, the wireless communication module 192, or the communication circuit 203) may select a transmission rate to be used for data transmission, based on the second adjustment criterion (e.g., an expected throughput). In yet another embodiment, the processor 201 may select, as a transmission rate to be used for data transmission, a transmission rate at which an expected throughput satisfies a specified condition, among a plurality of transmission rates available for data transmission. For example, the transmission rate satisfying the specified condition may include a transmission rate with the highest expected throughput among the plurality of transmission rates.

According to various embodiments, when wireless communication with an external electronic device is performed through a plurality of wireless communication channels, the electronic device 200 may equally or independently select an adjustment criterion for a transmission rate for transmitting data through each wireless communication channel. In still another embodiment, the processor 201 may configure the same adjustment criterion for transmission rates to be used for data transmission to an external electronic device through the plurality of wireless communication channels, based on the context information of the electronic device 200. In an embodiment, the processor 201 may independently configure an adjustment criterion for a transmission rate to be used for transmitting data through each communication channel, based on the context information of the electronic device 200 and/or the context information of the external electronic device. In an example, the plurality of wireless communication channels may be established based on at least one application or service executed in the electronic device 200.

According to other embodiments, when wireless communication with a plurality of external electronic devices is performed, the electronic device 200 may equally or independently select an adjustment criterion for a transmission rate for transmitting data to each external electronic device. In an embodiment, the processor 201 may configure the same adjustment criterion for a transmission rate to be used to transmit data to a plurality of external electronic devices, based on the context information of the electronic device 200. In another embodiment, the processor 201 may independently configure an adjustment criterion for a transmission rate to be used to transmit data to each external electronic device, based on the context information of the electronic device 200 and/or the context information of the external electronic device. For example, the context information of the external electronic device may be acquired from the external electronic device when a wireless communication link with the external electronic device is established, or received from the external electronic device during wireless communication with the external electronic device. In another example, the context information of the external electronic device may be included in at least one of a beacon, a signal related to a probe request (e.g., probe request/response), and a signal related to an association request (e.g., association request/response), or an action frame and transmitted to the electronic device 200. For example, the electronic device 200 may adjust the transmission rate, based on context information of the external electronic device.

Figure 8:
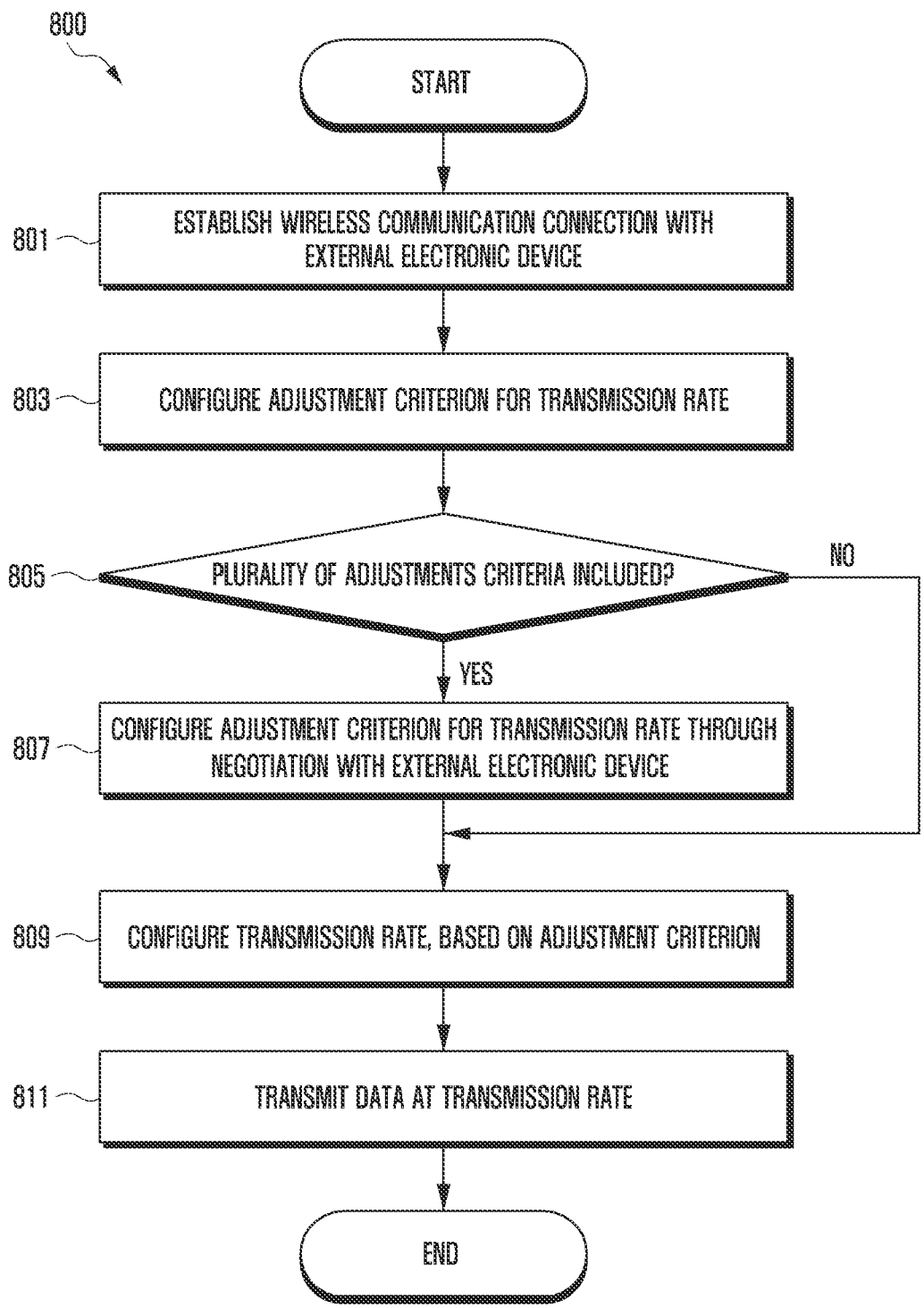
FIG. 8 is a flowchart in which an electronic device negotiates an adjustment criterion for a transmission rate with an external electronic device, according to an embodiment of the disclosure.

FIG. 8 is a flowchart 800 in which an electronic device negotiates an adjustment criterion for a transmission rate with an external electronic device, according to an embodiment of the disclosure. In the following embodiment, each operation may be performed sequentially, but is not necessarily performed sequentially. The order of each operation may be changed, and at least two operations may be performed in parallel. For example, the electronic device may be the electronic device 101 of FIG. 1 or the electronic device 200 of FIG. 2.

Referring to FIG. 8, according to various embodiments, an electronic device (e.g., a processor 120 of FIG. 1, a wireless communication module 192 of FIG. 1, a processor 201 of FIG. 2, or a communication circuit 203 of FIG. 2) may establish wireless communication connection with an external electronic device (e.g., an electronic device 102 or 104 or a server 108 of FIG. 1) in operation 801. For example, the wireless communication may include short-range communication (e.g., WiFi, Bluetooth, BLE, or IrDA) and/or cellular communication (e.g., 4th generation mobile communication or 5th generation mobile communication).

According to various embodiments, in operation 803, the electronic device (e.g., the processor 120 or 201, the wireless communication module 192, or the communication circuit 203) may identify an adjustment criterion for a transmission rate available in the electronic device 200. According to an embodiment, the processor 201 may identify an adjustment criterion for a transmission rate available in the electronic device 200, based on information related to the adjustment criterion for the transmission rate stored in the memory 205.

According to other embodiments, in operation 805, the electronic device (e.g., the processor 120 or 201, the wireless communication module 192, or the communication circuit 203) may identify whether a plurality of adjustment criteria for a transmission rate available in the electronic device 200 are provided.

According to various embodiments, when a plurality of adjustment criteria for a transmission rate available in the electronic device 200 are provided (e.g., "Yes" in operation 805), in operation 807, the electronic device (e.g., the processor 120 or 201, the wireless communication module 192, or the communication circuit 203) may configure an adjustment criterion for a transmission rate to be used for data transmission through negotiation with an external electronic device. In another embodiment, the processor 201 may control the communication circuit 203 such that information related to the adjustment criteria for a plurality of transmission rates available in the electronic device 200 is transmitted to the external electronic device. For example, the processor 201 may control the communication circuit 203 such that at least one adjustment criterion for a transmission rate related to context information of the electronic device 200 is extracted from among the plurality of adjustment criteria for a transmission rate and transmitted to the external electronic device. In another example, the processor 201 may select an adjustment criterion for a transmission rate, based on a response signal to information related to the adjustment criterion for a transmission rate received from the external electronic device through the communication circuit 203. In an example, the processor 201 may select, as an adjustment criterion for a transmission rate to be used for data transmission, an adjustment criterion for the transmission rate selected by the external electronic device and included in the response signal. In yet another embodiment, the processor 201 may control the communication circuit 203 such that a request signal related to an adjustment criterion for a transmission rate available in the external electronic device is transmitted to the external electronic device. The processor 201 may select an adjustment criterion for a transmission rate, based on the context information of the electronic device 200 and the adjustment criterion for a transmission rate available in the external electronic device, received from the external electronic device through the communication circuit 203.

According to other embodiments, when the adjustment criterion for a transmission rate is configured through negotiation with the external electronic device (e.g., operation 807), or when a plurality of adjustment criteria for a transmission rate available in the electronic device 200 are not provided (e.g., "NO" in operation 805), in operation 809, the electronic device (e.g., the processor 120 or 201, the wireless communication module 192, or the communication circuit 203) may configure a transmission rate to be used for data transmission, based on a configured adjustment criterion for the transmission rate.

According to various embodiments, in operation 811, the electronic device (e.g., the processor 120 or 201, the wireless communication module 192, or the communication circuit 203) may transmit data to an external electronic device, based on the transmission rate configured to be used for data transmission. In an embodiment, the processor 201 may control the communication circuit 203 such that data is transmitted to the external electronic device by using the MCS level, the bandwidth, and/or the number of spatial streams related to the transmission rate to be used for data transmission and configured in operation 809.

According to other embodiments, the electronic device 200 may negotiate an adjustment criterion for a transmission rate to be used for data transmission through wireless communication and other wireless communication for transmitting data to an external electronic device. In an example, when performing a wireless communication connection of Wi-Fi (e.g., WiFi direct) or cellular communication (e.g., 5th generation mobile communication or 4th generation mobile communication) with an external electronic device is performed, the electronic device 200 may negotiate an adjustment criterion for a transmission rate to be used for transmitting data through BLE with the external electronic device. For another example, the electronic device 200 may negotiate an adjustment criterion for a transmission rate to be used for transmitting data through BLE, while transmitting data through Wi-Fi or cellular communication (e.g., 5th generation mobile communication or 4th generation mobile communication) with an external electronic device.

Figure 9:
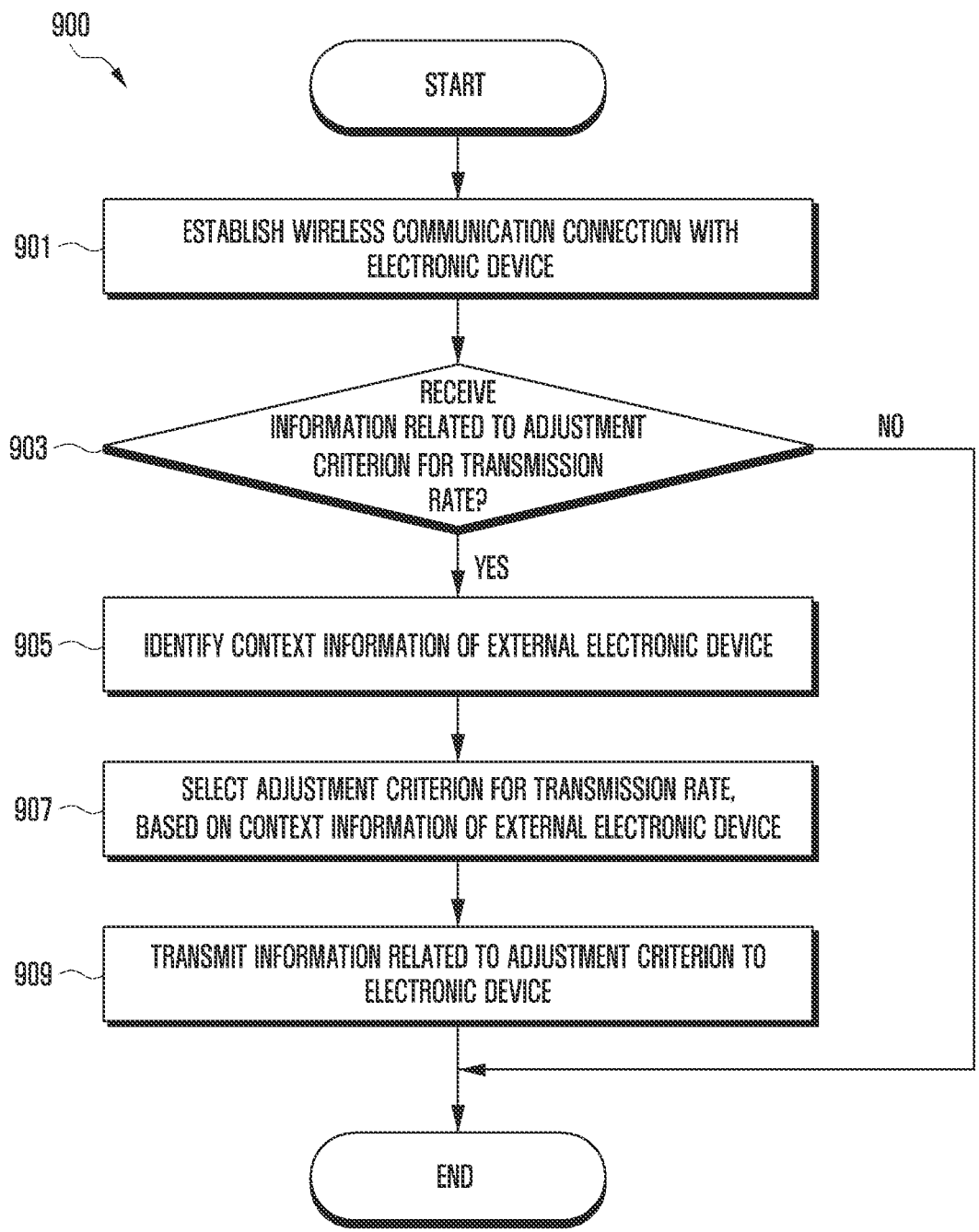
FIG. 9 is a flowchart in which an external electronic device selects an adjustment criterion for a transmission rate of an electronic device, according to an embodiment of the disclosure.

FIG. 9 is a flowchart 900 in which an external electronic device selects an adjustment criterion for a transmission rate of an electronic device, according to an embodiment of the disclosure. According to an embodiment, the operations of FIG. 4 may be detailed operations of operation 305 of FIG. 3. In the following embodiment, each operation may be performed sequentially, but is not necessarily performed sequentially. The order of each operation may be changed, and at least two operations may be performed in parallel. As an example, the external electronic device may be the electronic device 102 of FIG. 1.

Referring to FIG. 9, according to various embodiments, in operation 901, an external electronic device may establish a wireless communication connection with an electronic device 200. For example, the wireless communication may include short-range communication (e.g., Wi-Fi, Bluetooth, BLE, or IrDA) and/or cellular communication (e.g., 4th generation mobile communication or 5th generation mobile communication).

According to various embodiments, in operation 903, the external electronic device may identify whether information related to an adjustment criterion for a transmission rate is received from the electronic device 200 to which wireless communication is established. The information related to the adjustment criterion for a transmission rate, received from the electronic device 200, may include an adjustment criterion for a transmission rate available in the electronic device 200 or information requesting an adjustment criterion for a transmission rate available in the external electronic device. In embodiment, when information related to the adjustment criterion for a transmission rate is not received from the electronic device 200 (e.g., "NO" in operation 903), the external electronic device may terminate the operation according to an embodiment of the disclosure.

According to other embodiments, when information related to an adjustment criterion for a transmission rate is received from the electronic device 200 (e.g., "YES" in operation 903), in operation 905, the external electronic device may identify context information of the external electronic device. In an example, the context information of the external electronic device may include at least one of a battery status (e.g., a remaining amount of a battery), whether the external electronic device is charged, a type of the external electronic device, a service type of the external electronic device, a type of application or service being executed in the external electronic device, or a state (e.g., a rollable or foldable state of a display) of the display module (e.g., the display module 160 of FIG. 1) of the external electronic device.

According to various embodiments, in operation 907, the external electronic device may select an adjustment criterion for a transmission rate to be used by the electronic device 200 to transmit data to the external electronic device, based on context information of the external electronic device. In another embodiment, the external electronic device may select an adjustment criterion for a transmission rate to be used by the electronic device 200 to transmit data to the external electronic device from a plurality of adjustment criteria available in the electronic device 200, based on context information of the external electronic device. For example, when the remaining amount of a battery of the external electronic device satisfies a specified remaining amount, the external electronic device may select a first adjustment criterion (e.g., an expected power consumption amount) from among the plurality of adjustment criteria available in the electronic device 200 as an adjustment criterion for a transmission rate to be used by the electronic device 200 to transmit data to the external electronic device. In an example, the state in which the remaining amount of the battery satisfies the specified remaining amount may include a state in which the remaining amount of the battery of the external electronic device is equal to or less than the specified remaining amount. As another example, when the remaining amount of the battery of the external electronic device does not satisfy the specified remaining amount, the external electronic device may select second adjustment criterion (e.g., an expected throughput) among the plurality of adjustment criteria available in the electronic device 200 as an adjustment criterion for a transmission rate to be used by the electronic device 200 to transmit data to the external electronic device. In another example, the state in which the remaining amount of the battery does not satisfy the specified remaining amount may include a state in which the remaining amount of the battery of the external electronic device exceeds the specified remaining amount.

In yet another embodiment, when the electronic device 200 requests an adjustment criterion for a transmission rate available in the external electronic device, the external electronic device may select an adjustment criterion for a transmission rate to be used by the electronic device 200 to transmit data to an external electronic device, from at least one adjustment criterion available in the external electronic device, based on context information of the external electronic device.

According to other embodiments, in operation 909, the external electronic device may transmit, to the electronic device, information related to an adjustment criterion for a transmission rate to be used by the electronic device 200 to transmit data to the external electronic device. The adjustment criterion for a transmission rate to be used by the electronic device 200 to transmit data may include the adjustment criterion for a transmission rate selected in operation 907.

According to various embodiments, when the electronic device 200 requests an adjustment criterion for a transmission rate available in the external electronic device, the external electronic device may transmit, to the electronic device 200, information related to at least one adjustment criterion available in the external electronic device.

According to other embodiments, a method for operating an electronic device (e.g., the electronic device 101 of FIG. 1 or the electronic device 200 of FIG. 2) may include: in case that wireless communication with an external electronic device is performed, identifying an expected first power consumption amount of a first transmission rate, based on the first transmission rate and a failure rate of data transmission related to the first transmission rate, and identifying an expected second power consumption amount of a second transmission rate, based on the second transmission rate and a failure rate of data transmission related to the second transmission rate; selecting, as a data transmission rate, the first transmission rate or the second transmission rate, based on the first power consumption amount and the second power consumption amount; and transmitting data to the external electronic device, based on the selected data transmission rate.

According to various embodiments, the identifying of the power consumption amount may include: estimating the first power consumption amount expected based on the first transmission rate to be consumed until the data transmission to the external electronic device is successful, based on the first transmission rate, a failure rate of data transmission related to the first transmission rate, and an amount of power consumed based on the first transmission rate by the electronic device to transmit data once; and estimating the second power consumption amount expected based on the second transmission rate to be consumed until the data transmission to the external electronic device is successful, based on the second transmission rate, a failure rate of data transmission related to the second transmission rate, and an amount of power consumed based on the second transmission rate by the electronic device to transmit data once.

According to other embodiments, the selecting of transmission rate may include: selecting the first transmission rate as the data transmission rate in case that the first power consumption amount is less than the second power consumption amount; and selecting the second transmission rate as the data transmission rate in case that the second power consumption amount is less than the first power consumption amount.

According to various embodiments, the method may further include identifying an expected first throughput of the first transmission rate and an expected second throughput of the second transmission rate, wherein the selecting of a transmission rate includes selecting the data transmission rate, based on the first throughput and the first power consumption amount related to the first transmission rate, and the second throughput and the second power consumption amount related to the second transmission rate.

According to other embodiments, the selecting of a transmission rate may include: configuring, as a candidate transmission rate, at least one of the first transmission rate or the second transmission rate, based on the first throughput and the second throughput; and selecting, as the data transmission rate, a candidate transmission rate that satisfies a specified power consumption amount among the at least one candidate transmission rate.

According to various embodiments, the selecting of a transmission rate may include: configuring, as a candidate transmission rate, at least one of the first transmission rate and the second transmission rate, based on the first power consumption amount and the second power consumption amount; and selecting, as the data transmission rate, a candidate transmission rate that satisfies a specified throughput among the at least one candidate transmission rate.

According to other embodiments, the identifying of a throughput may include: estimating, based on the first transmission rate and a failure rate of data transmission related to the first transmission rate, the first throughput expected for a specified time based on the first transmission rate, by which data may be transmitted to the external electronic device; and estimating, based on the second transmission rate and a failure rate of data transmission related to the second transmission rate, the second throughput expected for a specified time based on the second transmission rate, by which data may be transmitted to the external electronic device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit;
memory, comprising one or more storage media, storing instructions; and
one or more processors communicatively coupled to the communication circuit and the memory,
wherein the instructions, when executed by the one or more processors individually or collectively, cause the electronic device to:
establish, via the communication circuit, connection for wireless communication with an external electronic device,
select, from a plurality of criteria, a criterion for determining a transmission rate to be used for data transmission, based on at least one of a context information of the electronic device or a context information of the external electronic device,
based on the selected criterion being a power consumption amount:
identify an expected first power consumption amount of a first transmission rate based on the first transmission rate, time required data transmission at the first transmission rate and a failure rate of data transmission related to the first transmission rate, and identify an expected second power consumption amount of a second transmission rate based on the second transmission rate, time required for data transmission at the second transmission rate and a failure rate of data transmission related to the second transmission rate, and
select, as a data transmission rate, the first transmission rate or the second transmission rate, based on the first power consumption amount and the second power consumption amount,
based on the selected criterion being the power consumption amount and a throughput:
identify an expected first throughput of the first transmission rate and an expected second throughput of the second transmission rate,
identify the expected first power consumption amount of the first transmission rate based on the first transmission rate, time required data transmission at the first transmission rate and the failure rate of data transmission related to the first transmission rate, and identify the expected second power consumption amount of the second transmission rate based on the second transmission rate, time required data transmission at the second transmission rate and the failure rate of data transmission related to the second transmission rate, and
select the data transmission rate, based on the first throughput and the first power consumption amount related to the first transmission rate, the second throughput and the second power consumption amount related to the second transmission rate, and
transmit data to the external electronic device, based on the selected data transmission rate.

2. The electronic device of claim 1, wherein the instructions, when executed by the one or more processors individually or collectively, further cause the electronic device to:
estimate the first power consumption amount expected based on the first transmission rate to be consumed until the data transmission to the external electronic device is successful, based on the first transmission rate, a failure rate of data transmission related to the first transmission rate, and an amount of power consumed based on the first transmission rate by the electronic device to transmit data once, and
estimate the second power consumption amount expected based on the second transmission rate to be consumed until the data transmission to the external electronic device is successful, based on the second transmission rate, a failure rate of data transmission related to the second transmission rate, and an amount of power consumed based on the second transmission rate by the electronic device to transmit data once.

3. The electronic device of claim 1, wherein the instructions, when executed by the one or more processors individually or collectively, further cause the electronic device to:
select the first transmission rate as the data transmission rate in response to the first power consumption amount being less than the second power consumption amount, and
select the second transmission rate as the data transmission rate in response to the second power consumption amount being less than the first power consumption amount.

4. The electronic device of claim 1, wherein the instructions, when executed by the one or more processors individually or collectively, further cause the electronic device to:
configure, as at least one candidate transmission rate, at least one of the first transmission rate or the second transmission rate, based on the first throughput and the second throughput, and
select, as the data transmission rate, a candidate transmission rate that satisfies a specified power consumption amount among the at least one candidate transmission rate.

5. The electronic device of claim 1, wherein the instructions, when executed by the one or more processors individually or collectively, further cause the electronic device to:
configure, as at least one candidate transmission rate, at least one of the first transmission rate and the second transmission rate, based on the first power consumption amount and the second power consumption amount, and
select, as the data transmission rate, a candidate transmission rate that satisfies a specified throughput among the at least one candidate transmission rate.

6. The electronic device of claim 1, wherein the instructions, when executed by the one or more processors individually or collectively, further cause the electronic device to:
estimate, based on the first transmission rate and a failure rate of data transmission related to the first transmission rate, the first throughput expected for a specified time based on the first transmission rate, by which data can be transmitted to the external electronic device, and
estimate, based on the second transmission rate and a failure rate of data transmission related to the second transmission rate, the second throughput expected for a specified time based on the second transmission rate, by which data can be transmitted to the external electronic device.

7. The electronic device of claim 1, wherein the communication circuit is configured to support wireless local area network (WLAN) or new radio (NR) communication.

8. A method performed by an electronic device, the method comprising:
   establishing connection for wireless communication with an external electronic device,
   selecting, from a plurality of criteria, a criterion for determining a transmission rate to be used for data transmission, based on at least one of a context information of the electronic device or a context information of the external electronic device;
   based on the selected criterion being a power consumption amount;
      identifying an expected first power consumption amount of a first transmission rate based on the first transmission rate, time required for data transmission at the first transmission rate and a failure rate of data transmission related to the first transmission rate, and identifying an expected second power consumption amount of a second transmission rate based on the second transmission rate, time required for data transmission at the second transmission rate and a failure rate of data transmission related to the second transmission rate; and
      selecting, as a data transmission rate, the first transmission rate or the second transmission rate, based on the first power consumption amount and the second power consumption amount;
   based on the selected criterion being the power consumption amount and a throughput:
      identifying an expected first throughput of the first transmission rate, and an expected second throughput of the second transmission rate, identifying the expected first power consumption amount of the first transmission rate based on the first transmission rate, time required for data transmission at the first transmission rate and the failure rate of data transmission related to the first transmission rate, and identifying the expected second power consumption amount of the second transmission rate based on the second transmission rate, time required for data transmission at the second transmission rate and the failure rate of data transmission related to the second transmission rate, and
      selecting the data transmission rate, based on the first throughput and the first power consumption amount related to the first transmission rate, and the second throughput and the second power consumption amount related to the second transmission rate; and
   transmitting data to the external electronic device, based on the selected data transmission rate.

9. The method of claim 8, wherein the identifying of the power consumption amount comprises:
   estimating the first power consumption amount expected based on the first transmission rate to be consumed until the data transmission to the external electronic device is successful, based on the first transmission rate, a failure rate of data transmission related to the first transmission rate, and an amount of power consumed based on the first transmission rate by the electronic device to transmit data once; and
   estimating the second power consumption amount expected based on the second transmission rate to be consumed until the data transmission to the external electronic device is successful, based on the second transmission rate, a failure rate of data transmission related to the second transmission rate, and an amount of power consumed based on the second transmission rate by the electronic device to transmit data once.

10. The method of claim 8, wherein the selecting of the first transmission rate or the second transmission rate comprises:
    selecting the first transmission rate as the data transmission rate in response to the first power consumption amount being less than the second power consumption amount; and
    selecting the second transmission rate as the data transmission rate in response to the second power consumption amount being less than the first power consumption amount.

11. The method of claim 8, wherein the selecting of a transmission rate comprises:
    configuring, as at least one candidate transmission rate, at least one of the first transmission rate or the second transmission rate, based on the first throughput and the second throughput; and
    selecting, as the data transmission rate, a candidate transmission rate that satisfies a specified power consumption amount among the at least one candidate transmission rate.

12. The method of claim 8, wherein the selecting of a transmission rate comprises:
    configuring, as at least one candidate transmission rate, at least one of the first transmission rate and the second transmission rate, based on the first power consumption amount and the second power consumption amount; and
    selecting, as the data transmission rate, a candidate transmission rate that satisfies a specified throughput among the at least one candidate transmission rate.

13. The method of claim 8, wherein the identifying of a throughput comprises:
    estimating, based on the first transmission rate and a failure rate of data transmission related to the first transmission rate, the first throughput expected for a specified time based on the first transmission rate, by which data can be transmitted to the external electronic device; and
    estimating, based on the second transmission rate and a failure rate of data transmission related to the second transmission rate, the second throughput expected for a specified time based on the second transmission rate, by which data can be transmitted to the external electronic device.

14. The electronic device of claim 1, wherein the context information of the electronic device includes at least one of a battery status of the electronic device, whether the electronic device is charged, a type of the electronic device, a service type of the electronic device, a type of application being executed in the electronic device, or a state of a display of the electronic device, and
    wherein the context information of the external electronic device is obtained from the external electronic device at the time of wireless communication connection with the external electronic device or while performing wireless communication with the external electronic device.

15. The method of claim 8, wherein the context information of the electronic device includes at least one of a battery status of the electronic device, whether the electronic device is charged, a type of the electronic device, a service type of the electronic device, a type of application being executed in the electronic device, or a state of a display of the electronic device, and wherein the context information of the external electronic device is obtained from the external electronic device at the time of wireless communication connection with the external electronic device or while performing wireless communication with the external electronic device.

16. The electronic device of claim 1, wherein the context information of the electronic device includes at least one of a type of application being executed in the electronic device or a state of a display of the electronic device, the state being enlarged or reduced.

17. The electronic device of claim 1, wherein the failure rate of data transmission related to the first transmission rate is based on a number of spatial streams related to the first transmission rate.

* * * * *